(12) United States Patent
Cote et al.

(10) Patent No.: US 11,073,670 B2
(45) Date of Patent: Jul. 27, 2021

(54) DEVICE AND METHOD FOR SEALING MULTIPORT SPLITTERS

(71) Applicant: Corning Optical Communications LLC, Hickory, NC (US)

(72) Inventors: Monique Lise Cote, Fort Worth, TX (US); Troy Dean Lindblad, Arlington, TX (US); Ziwei Liu, Fort Worth, TX (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/235,623

(22) Filed: Aug. 12, 2016

(65) Prior Publication Data

US 2018/0045905 A1 Feb. 15, 2018

(51) Int. Cl.
*G02B 6/44* (2006.01)
*G02B 6/38* (2006.01)

(52) U.S. Cl.
CPC ......... *G02B 6/4444* (2013.01); *G02B 6/3889* (2013.01); *G02B 6/3897* (2013.01); *G02B 6/4472* (2013.01); *G02B 6/4447* (2013.01); *G02B 6/4477* (2013.01)

(58) Field of Classification Search
CPC ............................. G02B 6/4444; G02B 6/4447
See application file for complete search history.

(56) References Cited

U.S. PATENT DOCUMENTS

| 5,007,860 A | 4/1991 | Robinson et al. |
| 5,097,529 A * | 3/1992 | Cobb .................. G02B 6/4442 |
| | | 385/135 |
| 5,280,556 A * | 1/1994 | Jones .................. G02B 6/4444 |
| | | 385/135 |

(Continued)

FOREIGN PATENT DOCUMENTS

| CN | 201704194 U | 1/2011 |
| JP | 63089421 A | 4/1988 |

(Continued)

OTHER PUBLICATIONS

International Search Report and Written Opinion PCT/US2017/04230 dated Nov. 15, 2017.

(Continued)

*Primary Examiner* — Chris H Chu
(74) *Attorney, Agent, or Firm* — Michael E. Carroll, Jr.

(57) ABSTRACT

A sealed multiport splitter device and method are disclosed. The fiber optic multiport comprises housing with an interior defining a first chamber and an adjacent second chamber. An optical splitter with a plurality of splitter legs connect to a plurality of optical fibers located in the first chamber. Potting material is disposed in the first chamber to physically secure the optical splitter, the splitter legs and the optical fibers. A wall having a first face and a second face separates the first chamber from the second chamber. The wall has a plurality of slots extended from the first face to the second face. The plurality of optical fibers route through the plurality of slots between the first chamber and the second chamber. A (Continued)

blocking material is adjacent to the wall to inhibit ingress of the potting material into the second chamber while the potting material is being cured.

27 Claims, 14 Drawing Sheets

(56) References Cited

U.S. PATENT DOCUMENTS

| | | |
|---|---|---|
| 5,408,570 A | 4/1995 | Cook et al. |
| 5,420,957 A * | 5/1995 | Burek .................. G02B 6/4446 385/135 |
| 5,553,186 A | 9/1996 | Allen |
| 5,647,045 A | 7/1997 | Robinson et al. |
| 5,781,686 A | 7/1998 | Robinson et al. |
| 5,862,290 A | 1/1999 | Burek et al. |
| 6,112,006 A | 8/2000 | Foss |
| 6,466,725 B2 | 10/2002 | Battey et al. |
| 6,738,555 B1 | 5/2004 | Cooke et al. |
| 6,771,861 B2 | 8/2004 | Wagner et al. |
| 7,120,347 B2 | 10/2006 | Blackwell, Jr. et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell, Jr. et al. |
| 7,444,056 B2 | 10/2008 | Allen et al. |
| 7,489,849 B2 | 2/2009 | Reagan et al. |
| 7,565,055 B2 | 7/2009 | Lu et al. |
| 7,627,222 B2 | 12/2009 | Reagan et al. |
| 7,653,282 B2 | 1/2010 | Blackwell, Jr. et al. |
| 7,680,388 B2 | 3/2010 | Reagan et al. |
| 7,709,733 B1 | 5/2010 | Plankell |
| 7,740,409 B2 | 6/2010 | Bolton et al. |
| 7,753,596 B2 | 7/2010 | Cox |
| 7,844,160 B2 | 11/2010 | Reagan et al. |
| 7,903,923 B2 | 3/2011 | Gronvall et al. |
| 8,025,445 B2 | 9/2011 | Rambow et al. |
| 8,213,761 B2 | 7/2012 | Gronvall et al. |
| 8,218,935 B2 | 7/2012 | Reagan et al. |
| RE43,762 E | 10/2012 | Smith et al. |
| 8,301,004 B2 | 10/2012 | Cooke et al. |
| 8,466,262 B2 | 6/2013 | Siadak et al. |
| 8,520,996 B2 | 8/2013 | Cowen et al. |
| 8,737,837 B2 | 5/2014 | Conner et al. |
| 8,755,663 B2 | 6/2014 | Makrides-Saravanos et al. |
| 8,770,861 B2 | 7/2014 | Smith et al. |
| 9,529,173 B2 * | 12/2016 | Courchaine .......... G02B 6/4471 |
| 2002/0064364 A1 | 5/2002 | Battey et al. |
| 2005/0129379 A1 | 6/2005 | Reagan et al. |
| 2005/0175307 A1 | 8/2005 | Battey et al. |
| 2006/0045430 A1 | 3/2006 | Theuerkorn et al. |
| 2006/0120672 A1 | 6/2006 | Cody et al. |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0269204 A1 | 11/2006 | Barth et al. |
| 2006/0269208 A1 * | 11/2006 | Allen .................. G02B 6/3878 385/135 |
| 2006/0280420 A1 | 12/2006 | Blackwell et al. |
| 2007/0003204 A1 * | 1/2007 | Makrides-Saravanos .................. G02B 6/4453 385/135 |
| 2007/0031100 A1 | 2/2007 | Garcia et al. |
| 2007/0031103 A1 * | 2/2007 | Tinucci ................ G02B 6/3849 385/139 |
| 2008/0175548 A1 | 7/2008 | Knecht et al. |
| 2008/0264664 A1 | 10/2008 | Dinh et al. |
| 2009/0060421 A1 | 3/2009 | Parikh et al. |
| 2009/0185835 A1 | 7/2009 | Park et al. |
| 2009/0245743 A1 | 10/2009 | Cote et al. |
| 2009/0263097 A1 | 10/2009 | Solheid et al. |
| 2010/0197222 A1 | 8/2010 | Scheucher |
| 2010/0247053 A1 | 9/2010 | Cowen et al. |
| 2010/0303426 A1 | 12/2010 | Davis |
| 2011/0019964 A1 | 1/2011 | Nhep et al. |
| 2011/0108719 A1 | 5/2011 | Ford et al. |
| 2011/0164854 A1 | 7/2011 | Desard et al. |
| 2011/0222829 A1 * | 9/2011 | Loeffelholz ............ G02B 6/445 385/135 |
| 2012/0008909 A1 | 1/2012 | Mertesdorf et al. |
| 2012/0251063 A1 | 10/2012 | Reagan et al. |
| 2013/0034333 A1 | 2/2013 | Holmberg et al. |
| 2013/0243386 A1 * | 9/2013 | Pimentel .............. G02B 6/4441 385/135 |
| 2013/0272671 A1 * | 10/2013 | Jones ................... G02B 6/3831 385/139 |
| 2014/0133806 A1 | 5/2014 | Hill et al. |
| 2014/0166342 A1 | 6/2014 | Claessens |
| 2014/0219622 A1 | 8/2014 | Coan et al. |
| 2016/0187607 A1 * | 6/2016 | Kowalczyk .......... G02B 6/4471 385/135 |

FOREIGN PATENT DOCUMENTS

| | | |
|---|---|---|
| WO | 2006113726 A1 | 10/2006 |
| WO | 2014123940 A1 | 8/2014 |
| WO | 2014167447 A1 | 10/2014 |
| WO | 2014197894 A1 | 12/2014 |

OTHER PUBLICATIONS

AU2013206651 Examination Report No. 1; dated March 10, 2016, 4 Pages.

EP14707013, Rules 161 and 162 Communication, dated September 17, 2015, 16 Pages.

International Search Report; PCT/US2014/014764; dated May 27, 2014.

Coaxum, L., et al., U.S. Appl. No. 62/341,947, "Fiber Optic Multiport Having Different Types of Ports for Multi-Use,", filed May 26, 2016.

* cited by examiner

DEVICE AND METHOD FOR SEALING MULTIPORT SPLITTERS

FIELD

The disclosure relates generally to fiber optic multiports, including multiports with optical splitters and more particularly to a device and method for sealing an optical splitter within a fiber optic multiport, which may be used in fiber optic networks.

BACKGROUND

As a result of the ever-increasing demand for broadband communications involving voice, video and data transmission, telecommunication and cable media service providers and/or operators have increasingly relied on fiber optics to provide large bandwidth telecommunication service to their subscribers. Fiber optic solutions have become the main part of telecommunication networks. Optical cables can transmit voice, data and video signals over very long distances at very high speed. Because of this, developments in fiber optic telecommunication networks have consistently focused on extending the optical fiber closer to the subscriber to the point that currently the subscriber can be connected directly to the fiber optic network through FTTx (fiber to the specific location "x") technology, including FTTH (fiber-to-the-home) technology, which provides an "all optical" communication network right to the subscribers at their homes. This deployment of optical fiber toward the subscriber is being driven by ever-increasing demand for more bandwidth, whether the optical fiber reaches all the way to the subscriber or not. Nonetheless, as the fiber optic network advances toward the subscriber, the need to provide fiber optic equipment, in locations having conditions that are not the most conducive for placement and operation of such fiber optic equipment increases. This particularly applies to fiber optic equipment that performs distributed splitting of the optical signal.

Economically, it is generally more beneficial and cost effective to provide as limited a quantity of cabling and hardware as possible to adequately provide optical service to and meet the needs of the most users in the network. Simply put, it is not cost effective for a service provider to run separate distribution cabling and hardware from the central office to each subscriber premises in the fiber optic network. Inherent to succeeding in this objective, an optical signal transmitted by the service provider at the central office is split into multiple optical signals as it is transmitted downstream and distributed over the fiber optic network. This "distributed splitting" approach becomes physically more challenging the closer the fiber optic network gets to the subscriber premises. The challenges not only involve signal strength, but also physical difficulties in locating suitable places to install optical splitters. Space limitations, environmental hazards, including weather, existing infrastructure installations, electrical communication facilities, for example, all factor into achieving the objective of advancing the fiber optic network to the subscriber premises.

Accordingly, as the fiber optic network advances closer to the subscriber, fiber optic devices, especially ones that provide optical signal splitting, must be sufficiently sealed against the environment and the ingress of any water or other contamination. Typically, fiber optic devices are fully assembled at the factory with a potting material, such as a gel or epoxy, used to seal the interior of the fiber optic device. However, because the fiber optic devices have open areas and fiber entry points, it is necessary to encase the devices in a fixture or mold to avoid any potting material leakage until the potting material cures. This can be cumbersome, time consuming and expensive.

Consequently, there is an unresolved need for a device and method that allows for the efficient and cost effective sealing of multiports for use in hazardous or difficult environments or locations.

No admission is made that any reference cited herein constitutes prior art. Applicant expressly reserves the right to challenge the accuracy and pertinence of any cited documents.

SUMMARY

One embodiment of the disclosure relates to a fiber optic multiport comprising an enclosure defining an interior. The fiber optic multiport also comprises a first chamber defined by the interior, wherein the first chamber has an optical splitter with a plurality of splitter legs extended therefrom and optically connected to a plurality of optical fibers located therein, and wherein a potting material is disposed in the first chamber to physically secure the optical splitter, the plurality of splitter legs and the plurality of optical fibers in the first chamber. The fiber optic multiport also comprises a second chamber defined by the interior adjacent the first chamber. The fiber optic multiport also comprises a wall separating the first chamber from the second chamber, wherein the wall has a first face and a second face, and wherein the wall has a plurality of slots extended therethrough from the first face to the second face, and wherein the plurality of optical fibers route through the plurality of slots between the first chamber and the second chamber. The fiber optic multiport also comprises a blocking material positioned adjacent to the wall to retain the potting material in the first chamber.

Another embodiment of the disclosure relates to a fiber optic multiport comprising an enclosure having a base and a cover, and defining an interior. The fiber optic multiport also comprises a first chamber in the interior, wherein the first chamber has an optical splitter with a plurality of splitter legs extended therefrom and optically connected to a plurality of optical fibers located therein, and wherein a potting material is disposed in the first chamber to physically secure the optical splitter, the plurality of splitter legs and the plurality of optical fibers in the first chamber. The fiber optic multiport also comprises a second chamber in the interior adjacent the first chamber. The fiber optic multiport also comprises a wall separating the first chamber from the second chamber, wherein the wall has a first face and a second face, and wherein the wall has a plurality of slots extended therethrough from the first face to the second face. The fiber optic multiport also comprises a foam pad comprising a compressible material attached to the wall, wherein the foam pad has a plurality of slits with at least one slit of the plurality of slits aligned with at least one slot of the plurality of slots of the wall, and wherein an optical fiber passage between the first chamber and the second chamber is formed thereby. The fiber optic multiport also comprises a plurality of fiber organizers positioned in the second chamber and comprising a first end and a second end, wherein at least one of the plurality of fiber organizers receives at the first end at least one of the plurality of optical fibers extended between the first chamber and the second chamber through the optical fiber passage, and receives at the second end a fiber optic cable comprising the at least one of the plurality of optical fibers at the first end; and wherein the plurality of fiber organizers presses against the foam pad for sealing the optical fiber passage in the wall and inhibiting ingress of the potting material into the second chamber.

Another embodiment of the disclosure relates to a fiber optic multiport. The fiber optic multiport comprises an enclosure defining an interior. The fiber optic multiport also comprises a first chamber positioned in the interior, wherein the first chamber has an optical splitter with a plurality of splitter legs extended therefrom and connected to a plurality of optical fibers located therein, and wherein potting material is disposed in the first chamber to physically secure the optical splitter, the plurality of splitter legs and the plurality of optical fibers in the first chamber. The fiber optic multiport also comprises a second chamber positioned in the interior adjacent the first chamber. The fiber optic multiport also comprises a wall separating the first chamber from the second chamber, wherein the wall has a first face and a second face, and wherein the wall has a plurality of slots extended therethrough from the first face to the second face, and wherein the plurality of optical fibers route through the plurality of slots between the first chamber and the second chamber. The fiber optic multiport also comprises a fiber organizer having a first end and a second end, wherein the fiber organizer is positioned in the second chamber and receives at the first end at least one of the plurality of optical fibers extended between the first chamber and the second chamber.

Yet another embodiment of the disclosure relates to a method of sealing a fiber optic multiport. The method comprises separating an interior of an enclosure of a multiport into a first chamber and a second chamber; positioning a wall having a plurality of slots between the first chamber and the second chamber; locating an optical splitter in the first chamber and extending optical fibers connected to the optical splitter through at least one of the plurality of slots to the second chamber; fitting a fiber retainer over the optical splitter and the optical fibers in the first chamber; positioning blocking material adjacent to the wall; pressing against the blocking material to seal gaps in the wall; disposing potting material over the fiber retainer, the optical splitter and the optical fibers in the first chamber to physically secure the optical splitter and the optical fibers in the first chamber; and curing the potting material.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2A is a partial detail view of the fiber organizer, blocking material and wall of FIG. 2;

DETAILED DESCRIPTION

Figure 1:
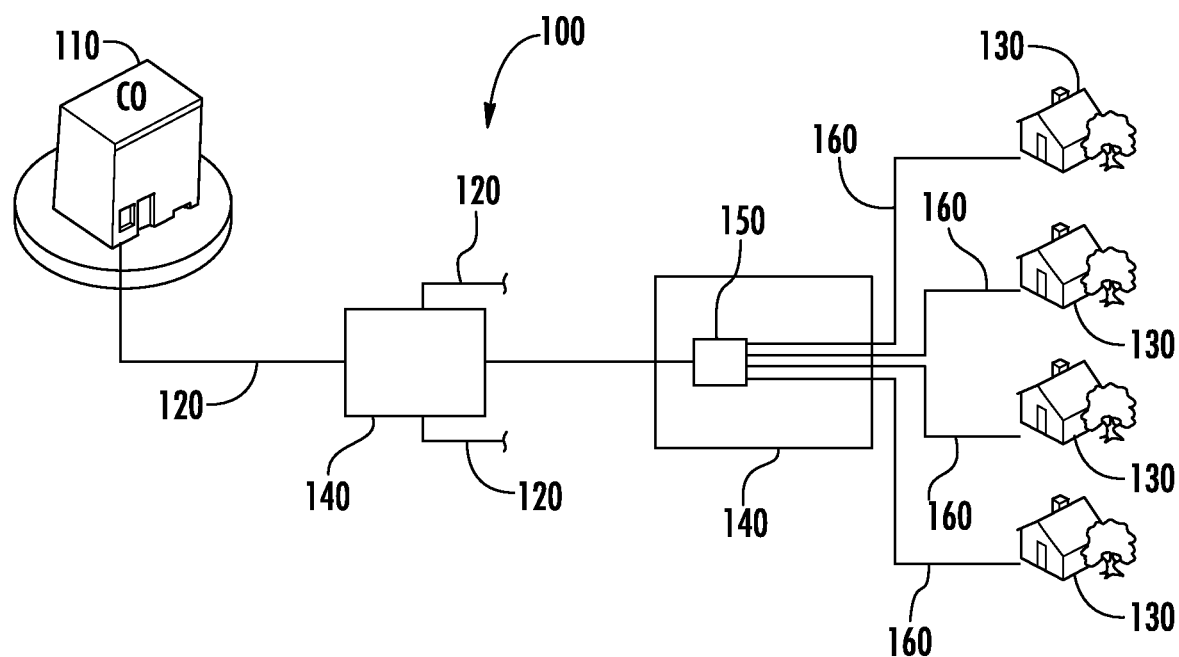
FIG. 1 is a plan diagram of a fiber optic network with a fiber optic distribution cable routed from a service provider's central office to subscriber premises.

Referring now to FIG. 1, there is shown a simplified fiber optic network 100 directed to supporting a fiber to the home (FTTH) solution. A service provider provides optical communication service over the fiber optic network 100 from a central office 110 through distribution cabling 120 and hardware to the user or subscriber at a subscriber premises 130. In this regard, the distribution cabling 120 extends from the central office 110 toward subscriber premises 130 utilizing intermediate distribution points or nodes 140 having fiber optic devices 150, such as a multiport, for example. The fiber optic devices 150 may include optical splitters used to split the optical signal into multiple optical signals which may be carried by drop cables 160 to the subscriber premises 130.

Although the optical communication service may properly be viewed as originating with the service provider at the central office 110, the actual flow of optical communication transmission is bidirectional. Optical signals are both sent and received at both ends of the fiber optic network 100 and points in between. Although optical signals travel in both directions, the perspective of the fiber optic network 100 from the central office 110 toward the subscriber premises 130 is typically referred to as "downstream," while the perspective from the subscriber premises 130 back to the central office 110 is typically referred to as "upstream." In this regard, the terms "upstream" and "downstream" do not necessarily denote or control actual optical signal transmission direction, but refer to a physical direction in the fiber optic network that is either toward the service provider (upstream) or toward the subscriber (downstream).

Figure 2:
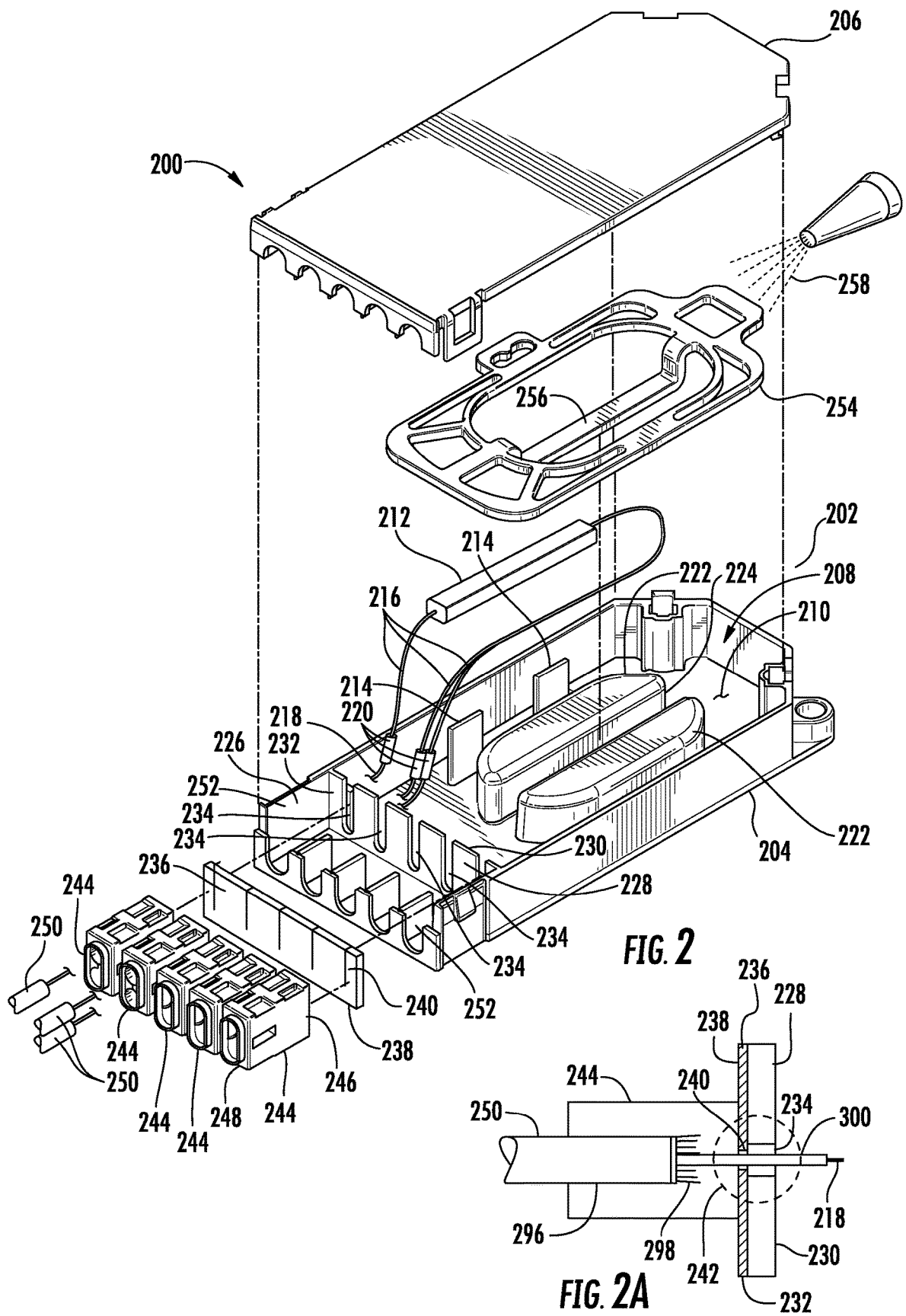
FIG. 2 is an exploded, perspective view of an exemplary fiber optic multiport having a first chamber and a second chamber, with an optical splitter and optical fibers located in the first chamber, and with potting material being disposed in the first chamber.

Referring now to FIG. 2, there is shown an exploded view of an exemplary fiber optic multiport 200 for use in a fiber optic network. The fiber optic multiport 200 may be used to split an optical signal transmitted by an optical service provider, which, typically, is initially transmitted from a central office (not shown in FIG. 2). As the optical signal moves downstream in the fiber optic network and closer to the user/subscriber premises, the optical signal may be required to be split multiple times in locations having conditions that are not the most conducive for placement and operation of fiber optic equipment. Accordingly, the fiber optic hardware needs to be designed to withstand such conditions. In this regard, the fiber optic multiport 200 in FIG. 2 has an enclosure 202 with a base 204 and a cover 206, and defines an interior 208. Additionally, the fiber optic multiport 200 may be sectioned into certain areas such that the interior 208 defines chambers to provide separation or isolation between functions and/or connections. In FIG. 2, a first chamber 210 is defined by the interior 208. An optical splitter 212 may be located in the first chamber 210. The optical splitter 212 may friction fit to the base 204 by two retainer clips 214 formed in the base 204. In this way, the optical splitter 212 may easily locate in the first chamber 210 of the interior 208. A plurality of splitter legs 216 extend from the optical splitter 212 and connect to a plurality of optical fibers 218 also located in the first chamber 210. The plurality of splitter legs 216 may connect to the plurality of optical fibers 218 using fusion splices 220 applied to the respective ones of the splitter legs 216 and optical fibers 218. The optical fibers 218 may each be from separate fiber optic cable 250. The fiber optic cables 250 may include an input fiber optic cable 250A having an input optical fiber 218A, and several output fiber optic cables 250B, each having an output optical fiber 218B. In FIG. 2 the input and output designations for fiber optic cables 250 and optical fiber 218: 250A, 250B, 218A, 218B, respectively, are not shown. Unless required for context in the description, a designation for denoting input or output will not be included for fiber optic cables 250, optical fibers 218, and splitter legs 216. The fiber optic cable 250 would have had its jacket 296 and strength member 298 (shown in FIG. 2A) removed from over the portion of the fiber optic cable 250, exposing the optical fiber 218 as it is routed in the first chamber 210. The strength member 298 may be constructed of an aramid fiber or Kevlar. It should be appreciated that the optical fiber 218 may still be contained in a buffer tube 300 to provide appropriate protection to the optical fiber 218. For simplicity of discussion and description, references to optical fiber 218 shall be understood to include reference to the buffer tube 300 unless the context of the discussion indicates otherwise. Also, reference to fiber optic cable 250 shall be understood to refer to both fiber optic cables and fiber optic pigtails. The fiber optic cables 250 may connect to other fiber optic equipment, such as another multiport, or may function as drop cables and be routed to the subscriber premises. In either situation, the integrity of the connection, i.e., fusion splice 220, between the splitter legs 216 and the optical fibers 218 may be maintained. Further, it is important that the splitter legs 216 and the optical fibers 218 may be managed and protected. With respect to fiber management, a mandrel 222 having a center cut 224 protrudes from the base 204 into the interior 208. The plurality of splitter legs 216 and the plurality of optical fibers 218 may be routed around the mandrel 222 for fiber management purposes.

External connections to the fiber optic multiport 200 may be designated to an area of the fiber optic multiport 200 separate from the first chamber 210. In FIG. 2, a second chamber 226 is defined by the interior 208 adjacent the first chamber 210. A wall 228 interposed between the first chamber 210 and the second chamber 226 separates and isolates the first chamber 210 from the second chamber 226. The wall 228 has a first face 230 and a second face 232. Additionally, a plurality of slots 234 extend through the wall 228 between the first face 230 and the second face 232. To seal and isolate the second chamber 226 from the first chamber 210, a blocking material 236 is attached to the wall 228. As used herein, any reference to "seal" or "sealing" with regard to the first chamber 210 from the second chamber 226 refers to and means inhibiting any material, such as for example potting material, from leaking or flowing from its intended location, such as the first chamber 210 into the second chamber 226. The blocking material 236 may be attached on the first face 230 or the second face 232 and may be a compressible foam piece that seals any gaps upon pressure being applied to it. Since the plurality of optical fibers 218 located in the first chamber 210 are extended from fiber optic cables 250 external to the fiber optic multiport 200, the optical fibers 218 may need to route between the first chamber 210 and the second chamber 226. The optical fibers 218 may be routed between the first chamber 210 and the second chamber 226 through the plurality of slots 234 in the wall 228 and through the blocking material 236 without compromising the integrity of the wall 228 and the sealing and/or isolation between the first chamber 210 and the second chamber 226.

Continuing with reference to FIG. 2, and now also to FIG. 2A, the blocking material 236 is shown as a foam pad 238 attached to the second face 232 of the wall 228. The foam pad 238 has a plurality of slits 240 and may be attached to the wall 228 in such a way that the plurality of slits 240 align with the plurality of slots 234 to form optical fiber passages 242 between the first chamber 210 and the second chamber 226. In this way, the plurality of optical fibers 218 may then be routed through the foam pad 238 between the first chamber 210 and the second chamber 226 through the optical fiber passages 242 formed by the slots 234 in the wall 228 and the slits 240 in the foam pad 238. As previously mentioned, the foam pad 238 may be constructed of a compressible material which fills any gaps in the wall 228, including the optical fiber passages 242 formed by the plurality of slots 234 in the wall 228 and the plurality of slits 240 in the foam pad 238, when pressure is applied to the foam pad 238, thereby sealing the first chamber 210 from the second chamber 226.

The optical fibers 218 located in the first chamber 210 and the second chamber 226 are from fiber optic cables 250, which enter the fiber optic multiport 200 at the second chamber 226. To facilitate the organization and connection of the fiber optic cables 250 to the fiber optic multiport 200, a plurality of fiber organizers 244 may be used. The plurality of fiber organizers 244 may be positioned in the second chamber 226 in separate placement partitions 252. The placement partitions 252 may be arranged to coordinate with the optical fiber passages 242, and, thereby, the slits 240 in the foam pad 238 and the slots 234 in the wall 228. When installed in the placement partition 252, the fiber organizer 244 may have a first end 246 facing toward the wall 228, and a second end 248 facing away from the wall 228 and the second end 248 provides access for the fiber optic cable 250 to enter the fiber optic multiport 200. The fiber organizer 244 also provides a protected location at the point in which the jacket 296, strength member 298 and other material has been removed to expose the optical fiber 218 in its buffer tube 300, which may route between the second chamber 226 and the first chamber 210, as discussed above. Additionally, when the fiber organizers 244 are installed in the respective placement partitions 252, the fiber organizers 244 provide pressure to the foam pad 238, compressing the foam pad 238 and causing it to seal any gaps in the wall 228, including the optical fiber passages 242 through which the optical fibers 218 have been routed.

Referring back to the first chamber 210, a fiber retainer 254 is shown in FIG. 2. The fiber retainer 254 positions over the optical splitter 212, the plurality of splitter legs 216 and the plurality of optical fibers 218. A mid-span member 256 of the fiber retainer 254 friction fits into the center cut 224 of the mandrel 222 to maintain the fiber retainer 254 in place in the first chamber 210 over the optical splitter 212, the plurality of splitter legs 216 and the plurality of optical fibers 218. In this way, the optical splitter 212, plurality of splitter legs 216 and the plurality of optical fibers 218 are set in their installed positions in the first chamber 210 and are restricted from any upward movement. This allows for the effective application of the potting material 258 to the first chamber 210. Without the fiber retainer 254, the plurality of splitter legs 216 and the plurality of optical fibers 218 may tend to float up as the potting material 258 is being disposed in the first chamber 210, which may compromise the sealing integrity of the potting material 258, and, thereby, the first chamber 210 and the fiber optic multiport 200. The potting material 258 may be any suitable compound used for potting applications, such as a non-limiting example SSP5 gel.

Figure 3:
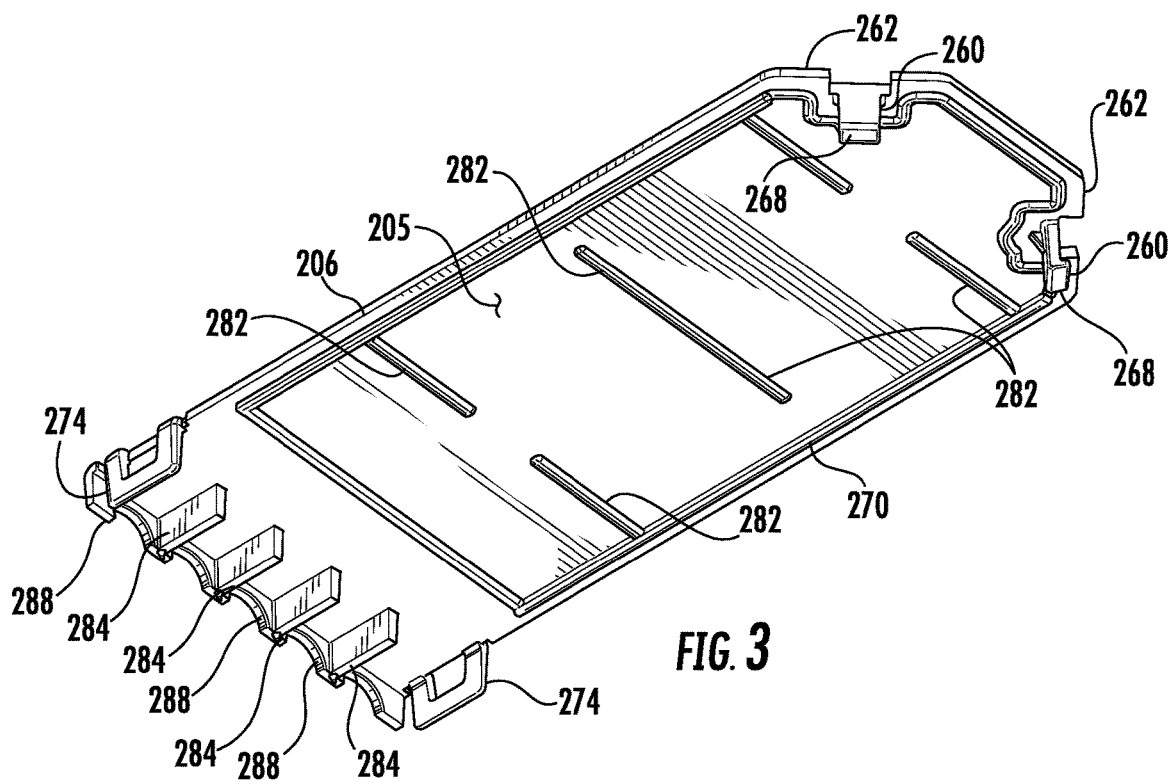
FIG. 3 is an underside, perspective view of a cover of the fiber optic multiport shown in FIG. 2.
Figure 4:
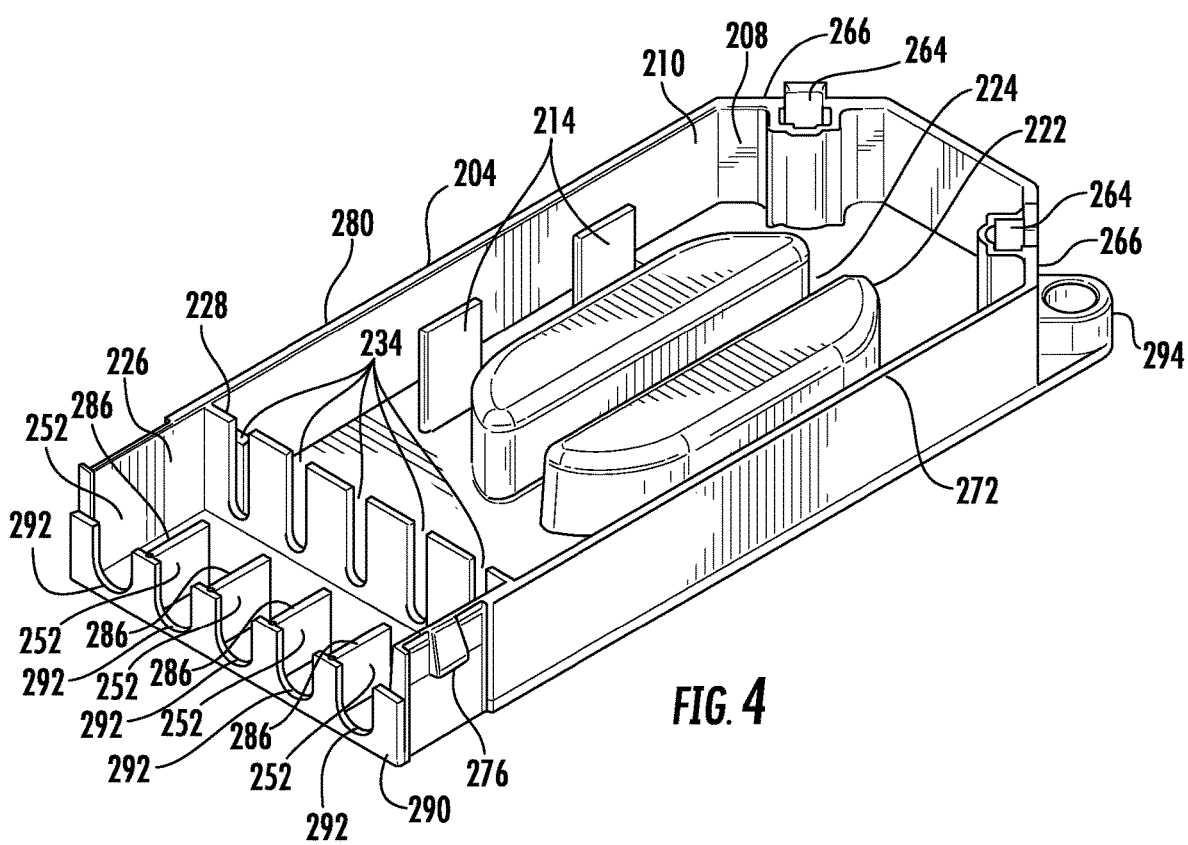
FIG. 4 is a top perspective view of the fiber optic multiport of FIG. 2 showing an interior in an unpopulated state.

Referring now to FIGS. 3 and 4, there are shown perspective views of an underside 205 of the cover 206 (FIG. 3) and the base 204 (FIG. 4). The cover 206 closes onto the base 204 using tabs 260 that extend downward from angled cover corners 262. The tabs 260 insert into receivers 264 formed at angled base corners 266. Hooked ends 268 on the tabs 260 latch to protrusions (not shown in FIG. 4) located in the receivers 264 to provide for a secure, tight fit of the cover 206 to the base 204, such that a perimeter ridge 270 of the cover 206 is forced against a portion of the perimeter edge 272 of the base 204 and the wall 228. Additionally, loops 274 extending from the cover 206 fit over and are captured by detents 276 that extend out from the sides 280 of the base 204.

Stiffeners 282 extending from the underside 205 of the cover 206 strengthen the cover 206 and restrict any bowing of the cover 206 so that the cover 206 maintains a flat, planar orientation to allow for consistent contact of the perimeter ridge 270 of the cover 206 to the perimeter edge 272 of the base 204. In this regard, a tight fit of the cover 206 to the base 204 may be maintained, and the interior 208, as shown in FIG. 4 with the mandrel 222 and the retainer clips 214, may be secured. Also, when the cover 206 is closed on the base 204, top separators 284 align with bottom separators 286 to define, with the wall 228, the placement partitions 252. Additionally, cover face molding 288 meets base face molding 290 to form a plurality of front openings 292 for each placement partition 252 with each of the plurality of front openings 292 centrally aligned with each of the plurality of slots 234 in the wall 228. Mounting holes 294 are formed into and extend from the base 204 to allow the base 204 to be securely fastened to a support.

Figure 5:
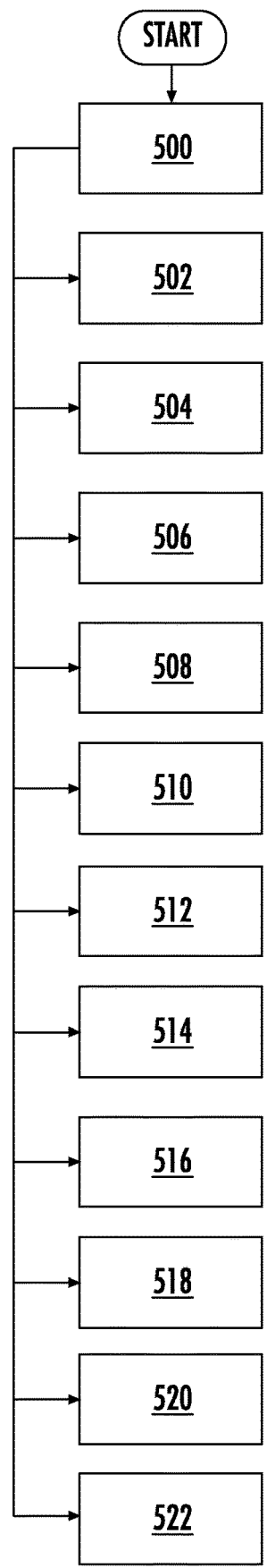
FIG. 5 is a flowchart diagram illustrating an exemplary process for sealing a fiber optic multiport that may utilize a blocking material adjacent to a wall separating a first chamber and a second chamber.

FIG. 5 depicts a method of sealing a fiber optic multiport 200. The method may be implemented by separating an interior 208 of an enclosure 202 of the fiber optic multiport 200 into a first chamber 210 and a second chamber 226 (block 500); positioning a wall 228 having a plurality of slots 234 between the first chamber 210 and the second chamber 226 (block 502); locating an optical splitter 212 in the first chamber 210 and extending optical fibers 218 optically connected to the optical splitter 212 through at least one of the plurality of slots 234 to the second chamber 226; (block 504); fitting a fiber retainer 254 over the optical splitter 212 and the optical fibers 218 in the first chamber 210; (block 506); positioning blocking material 236 adjacent to the wall 228 (block 508), the blocking material 236 may be a foam pad 238 constructed of a compressible material, and having a plurality of slits 240 with at least one slit 240 of the plurality of slits 240 aligned with at least one slot 234 of the plurality of slots 234 of the wall 228; pressing against the blocking material 236 to seal gaps in the wall 228 (block 510); disposing potting material 258 over the fiber retainer 254, the optical splitter 212 and the optical fibers 218 in the first chamber 210 to physically secure the optical splitter 212 and the optical fibers 218 in the first chamber 210 (block 512); and curing the potting material 258 (block 514). The method may further include positioning at least one fiber organizer 244 in the second chamber 226 with the at least one fiber organizer 244 having a first end 246 and a second end 248 and with the at least one fiber organizer 244 pressing against the foam pad 238 to compress the foam pad 238 (block 516); receiving at the first end 246 of at least one fiber organizer 244 at least one of the optical fibers 218 extended between the first chamber 210 and the second chamber 226 through the at least one slot 234 of the plurality of slots 234 (block 518); seating a fiber optic cable 250 covering the optical fiber 218, received external from the enclosure 202 at the second end 248 of the at least one fiber organizer 244 (block 520) and disposing potting material 258 in the at least one fiber organizer 244 (block 522).

Figure 6:
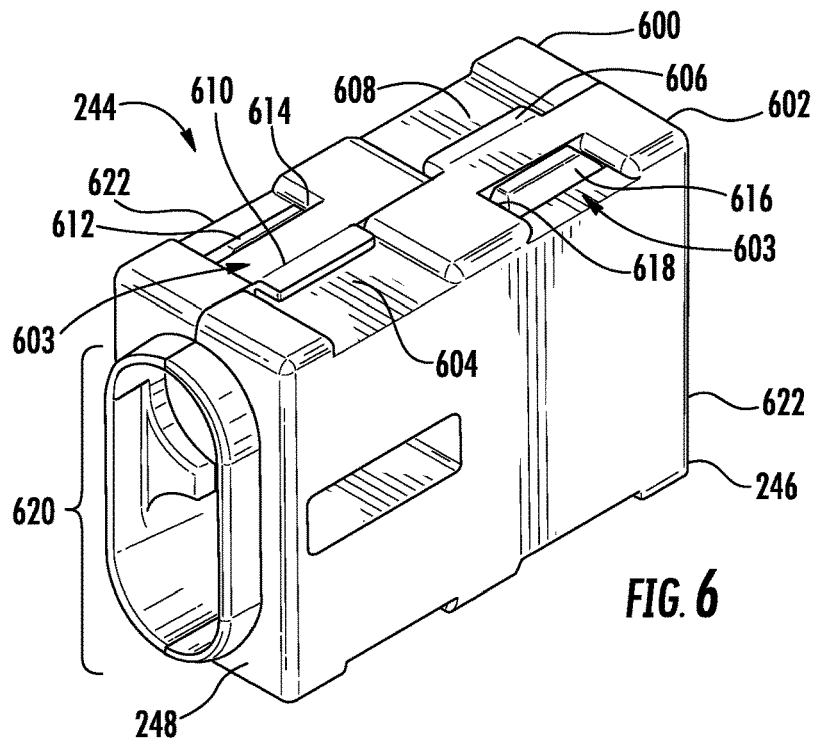
FIG. 6 is a side perspective view of an exemplary fiber organizer of the fiber optic multiport of FIG. 2 shown in an assembled state.
Figure 7:
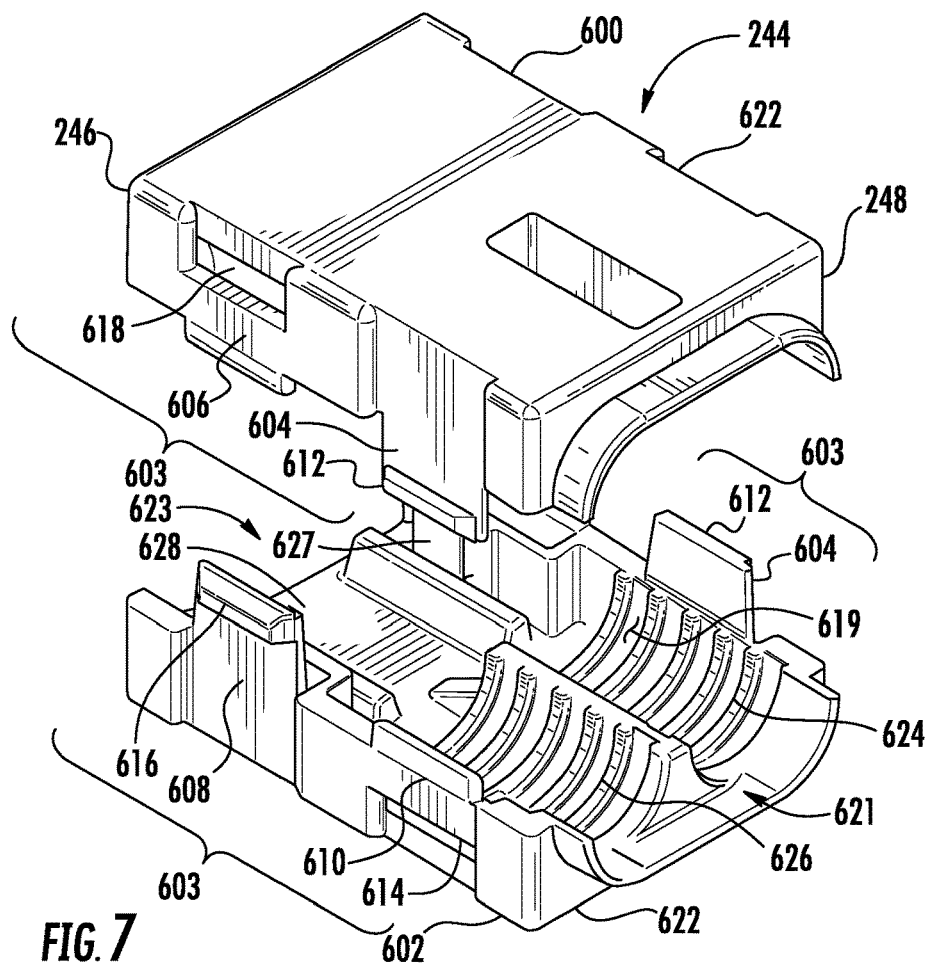
FIG. 7 is an exploded, perspective view of the fiber organizer of FIG. 6.
Figure 8:
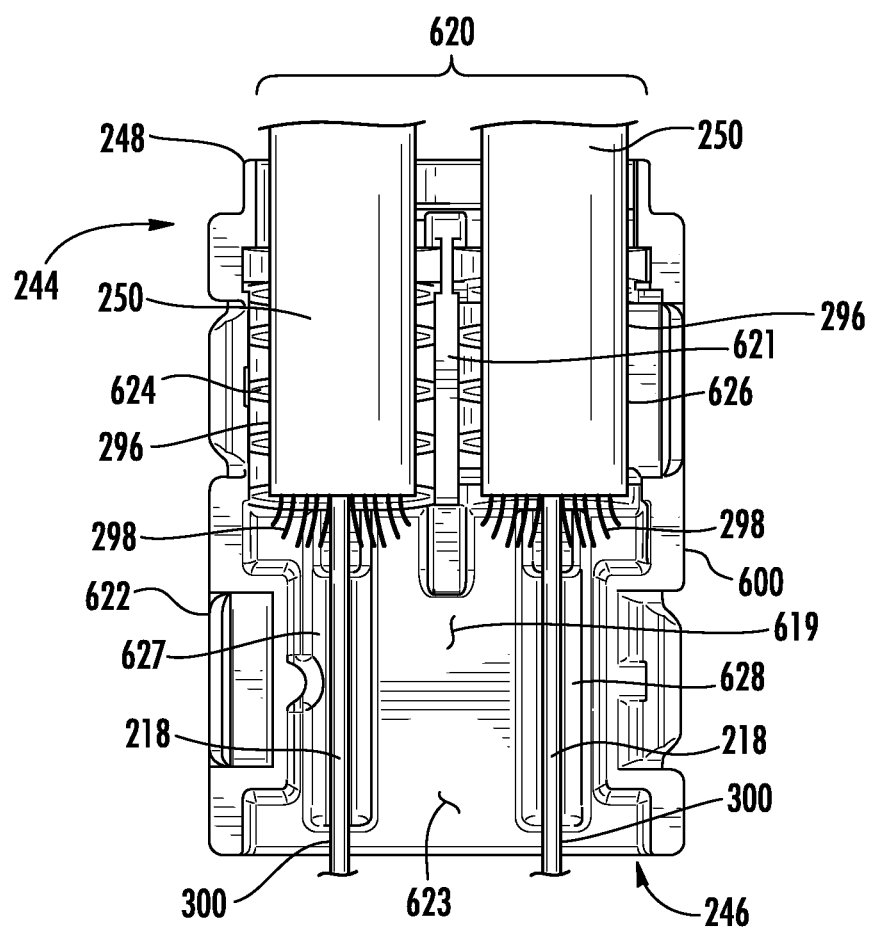
FIG. 8 is a partial detail, plan view of the fiber organizer of FIGS. 6 and 7 showing the interior of a first segment of the fiber organizer.
Figure 9:
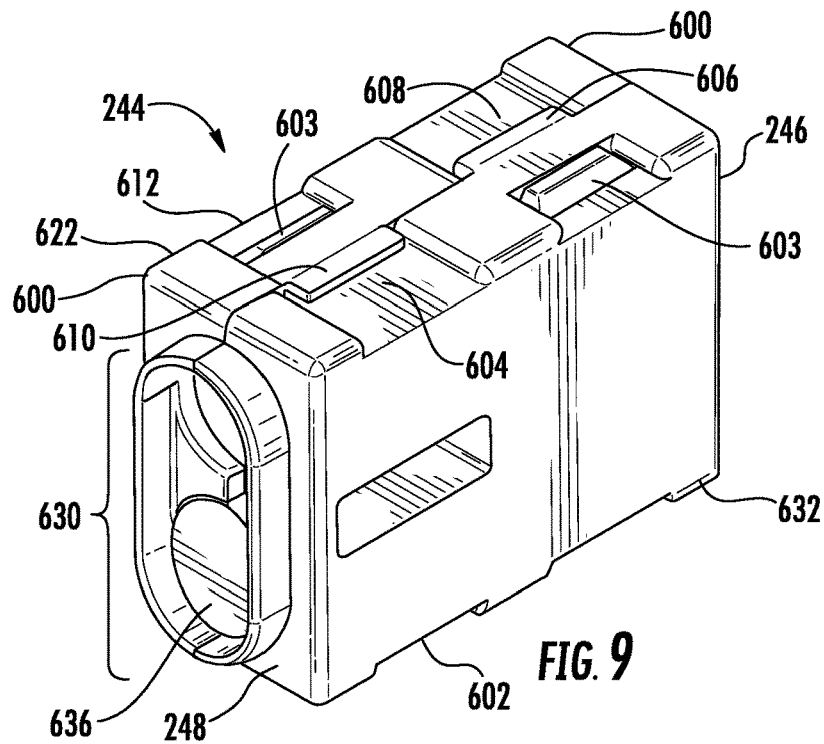
FIG. 9 is a side perspective view of an exemplary fiber organizer of the fiber optic multiport of FIG. 2 shown in an assembled state.
Figure 10:
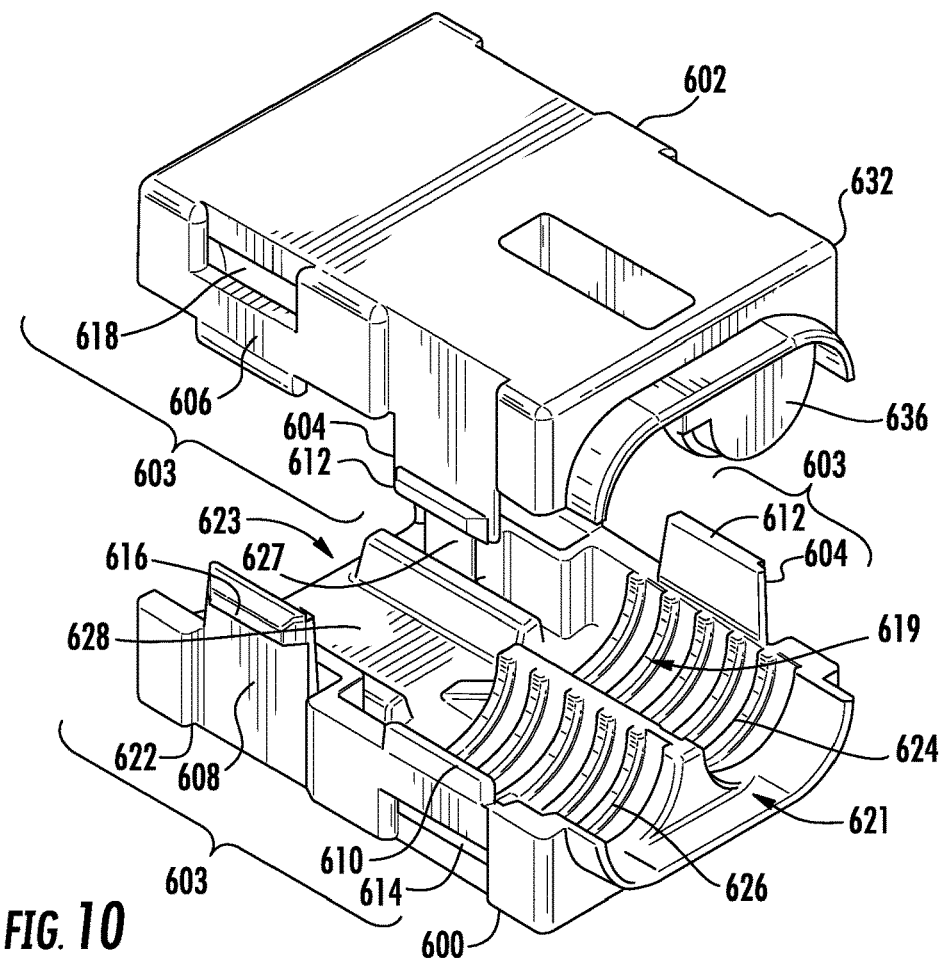
FIG. 10 is an exploded, perspective view of the fiber organizer of FIG. 9.

Turning now to FIGS. 6-12C, there are shown views of exemplary fiber organizers 244. With particular reference to FIGS. 6, 7, 9 and 10, the fiber organizers 244 are shown as having a first segment 600 and a second segment 602 each with a complementary attachment structure 603. The complementary attachment structure 603 may include a first side tab 604, a first side latch 606, a second side tab 608 and a second side latch 610. In this regard, as shown in FIGS. 6 and 9, the first segment 600 and the second segment 602 may be attached together by mating first side tab 604 with second side latch 610, and second side tab 608 with first side latch 606. Additionally, when the first segment 600 and the second segment 602 are attached together, a first hook end 612 of first side tab 604 positions in and is retained by a second latch slot 614 of second side latch 610, while a second hook end 616 of second side tab 608 positions in and is retained by a first latch slot 618 of first side latch 606. In this manner, as shown in FIGS. 7 and 10, the first segment 600 may attach to the second segment 602 by the attachment structure 603 to define an interior space configuration 619 having a fiber optic cable seating area 621 and an optical fiber pass-through 623.

The first segment 600 may be one of a first design type 622 or a second design type 632, while the second segment 602 may also be one of the first design type 622 or the second design type 632. The first design type 622 may form one half of the interior space configuration 619 having a first fiber optic cable seating area 624, a second fiber optic cable seating area 626, a first optical fiber pass-through 627, and a second optical fiber pass-through 628 as shown in FIG. 7. The second design type 632 may form one half of the interior space configuration 619 having a first fiber optic cable seating area 624 and a blocked second fiber optic cable seating area 626, and a first optical fiber pass-through 627 and a blocked second optical fiber pass-through 628 as shown in FIG. 10. In this regard, whether the first segment 600 is a first design type 622 or a second design type 632; and whether the second segment 602 is a first design type 622 or a second design type 632 may determine whether the interior space configuration 619 is a first interior space configuration 620, a second interior space configuration 630 or a third interior space configuration 640.

In FIG. 6, the fiber organizer 244 is depicted in an assembled state, while, in FIG. 7 the fiber organizer 244 is shown in an exploded view. In FIGS. 6 and 7, the fiber organizer 244 is shown as having the first interior space configuration 620. The first interior space configuration 620 may be formed when both the first segment 600 and the second segment 602 are first design types 622. A first design type 622 provides for a first fiber optic cable seating area 624, a second fiber optic cable seating area 626, a first optical fiber pass-through 627, and a second optical fiber pass-through 628. Accordingly, when the fiber organizer 244 has two first design types 622 attached together as the first segment 600 and the second segment 602, a first interior space configuration 620 is formed providing for two fiber optic cables 250 and their respective optical fibers 218 to be received. Additionally, although the fiber optic cables 250 are shown as having only one optical fiber 218, the fiber optic cables 250 each may have one or multiple optical fibers 218.

Referring now to FIG. 8, an internal view of the first segment 600 of the fiber organizer 244 having a first interior space configuration 620 is shown. Since the first segment 600 and the second segment 602 of the fiber organizer 244 with a first interior space configuration 620 in FIGS. 6 and 7 are both first design types 622, the internal views of the first segment 600 and the second segment 602 are the same. In FIG. 8, two fiber optic cables 250 received at the second end 248 of the fiber organizer 244 are shown seated in the first fiber optic cable seating area 624 and the second fiber optic cable seating area 626 of the first segment 600. The jackets 296 and strength members 298 of the fiber optic cables 250 are shown as terminated in the fiber organizer 244 and removed with the strength members 298 extending slightly past the end of the jackets 296. The optical fibers 218 (not visible in FIG. 8), which may be covered by buffer tubes 300, may continue and extend from the fiber organizer 244 at the first end 246. When the first segment 600 and second segment 602 are attached together, as described above, and fiber optic cables 250 are seated in the fiber organizer 244 with the optical fibers 218 extending from the fiber organizer 244, potting material, such as for example, epoxy (not shown in FIG. 8), may be disposed in the fiber organizer 244 to seal the first segment 600 and the second segment 602 with the fiber optic cables 250 therein. The potting material secures the jacket 296 and strength members 298 such that the fiber optic cable 250 is restrained and the optical fibers 218 are restricted from pistoning into and out of the jacket 296. The potting material may be any suitable epoxy, for example, URB 144 or Loctite 3360.

Turning now to FIGS. 9 and 10, there are shown views of an exemplary fiber organizer 244. In a similar manner to FIG. 6, the fiber organizer 244 in FIG. 9 is depicted in an assembled state, while, in a similar manner to FIG. 7, the fiber organizer 244 in FIG. 10 is shown in an exploded view. Additionally, in FIGS. 9 and 10, the first segment 600 and the second segment 602 of fiber organizer 244 are attached together in the same manner as discussed above.

In FIGS. 9 and 10, the fiber organizer 244 is shown as having a second interior space configuration 630. The second interior space configuration 630 results when the first segment 600 is the first design type 622 and the second segment 602 is the second design type 632. As discussed above, the first design type 622 has the first fiber optic cable seating area 624, a second fiber optic cable seating area 626, a first optical fiber pass-through 627, and a second optical fiber pass-through 628. However, while the second design type 632 may have the first fiber optic cable seating area 624, the second design type 632 may have a blocked second fiber optic cable seating area 626. Additionally, while the second design type 632 may have the first optical fiber pass-through 627, the second design type 632 may have a blocked second optical fiber pass-through 628. Accordingly, when the fiber organizer 244 has the first design type 622 and the second design type 632 attached together as the first segment 600 and the second segment 602, the second interior space configuration 630 may be formed providing for one fiber optic cable 250 and its optical fibers 218 to be received. As such, a second fiber optic cable 250 and its optical fibers 218 may not be received by the fiber organizer 244 due to the blocked second fiber optic cable seating area 626 and the blocked second optical fiber pass-through 628. Additionally, although the fiber optic cable 250 is shown as having one optical fiber 218, the fiber optic cables 250 each may have one or multiple optical fibers 218.

Figure 11:
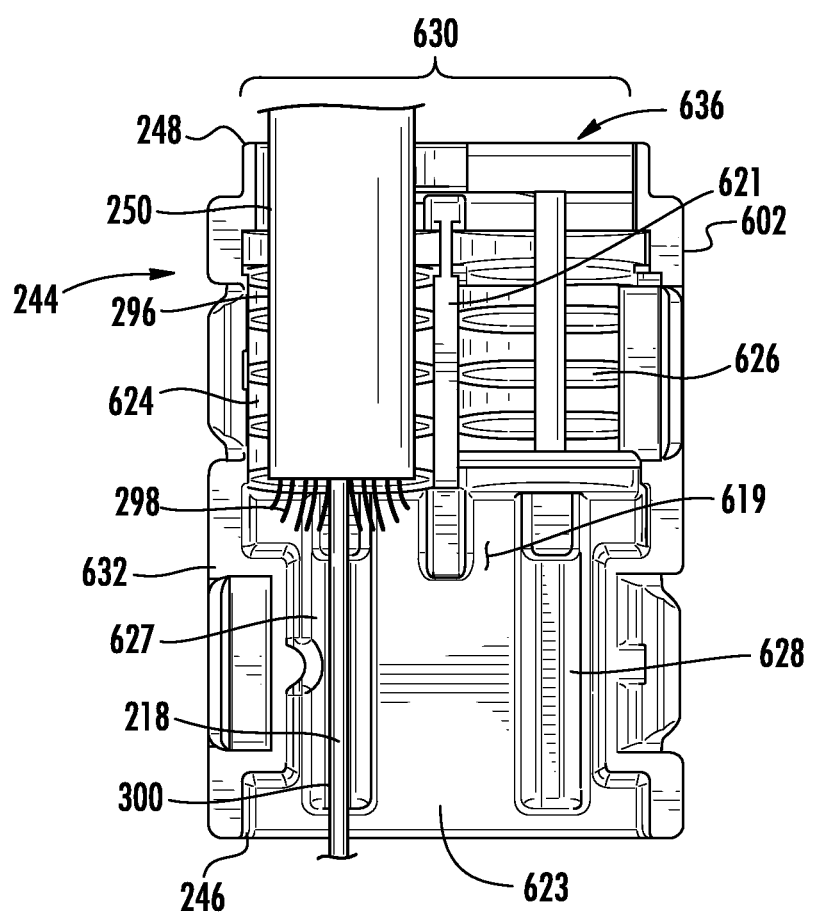
FIG. 11 is a partial detail, plan view of the fiber organizer of FIGS. 9 and 10 showing the interior of a first segment of the fiber organizer.

Referring now to FIG. 11, an internal view of the second segment 602 of the fiber organizer 244 is shown. In FIG. 11, a fiber optic cable 250 received at the second end 248 of the fiber organizer 244 is shown seated in the first fiber optic cable seating area 624 of the second segment 602. The jacket 296 and strength members 298 of the fiber optic cable 250 are shown as terminated in the fiber organizer 244 and removed with the strength members 298 extending slightly past the end of the jacket 296. The optical fiber 218 (not visible in FIG. 11), which may be covered by buffer tube 300, may continue and extend from the fiber organizer 244 at the first end 246. The second fiber optic cable seating area 626 is blocked by a cap 636 which may be formed in the second segment 602 (shown in FIG. 10). When the first segment 600 (not shown in FIG. 11) and second segment 602 are attached together, as described above, potting material, such as for example epoxy, may be disposed in the fiber organizer 244 to seal the first segment 600 and the second segment 602 with the fiber optic cable 250 therein.

As discussed with regard to FIGS. 6-8 and FIGS. 9-11, the first design type 622 and second design type 632 may be used in different combinations as the first segment 600 and second segment 602 of a fiber organizer 244 to provide the first interior space configuration 620 or the second interior space configuration 630. A third interior space configuration 640 may also be provided by using the second design type 632 as both the first segment 600 and the second segment 602. In this regard, both the first fiber optic cable seating area 624 and the second fiber optic cable seating area 626, as well as both the first optical fiber pass-through 627 and the second optical fiber pass-through 628 may be blocked by caps 636. A fiber organizer 244 having a third interior space configuration 640 may be used in a fiber optic multiport 200 which has an optical splitter 212 that splits an input optical signal into six or less output optical signals, examples of which may include 1:2, 1:4 and 1:6 optical splitter. In such cases, not all slots 234 in the wall 228 and slits 240 in the foam pad 238 may be used, and, additionally, one or more placement partitions 252 in the second chamber 226 may not require the fiber organizers 244 to receive optical fiber(s) 218 and the respective fiber optic cable(s) 250. However, without the pressure of a fiber organizer 244 on a portion of the foam pad 238, the foam pad 238 may not fully compress and, therefore may not seal all the gaps in the wall 228, including the fiber optic passages 242. Accordingly, a fiber organizer 244 that does not receive a fiber optic cable 250 and its optical fiber 218 but does apply pressure on the foam pad 238 may be needed. A fiber organizer 244 having the third interior space configuration 640 may be used for such purpose.

Figure 12A:
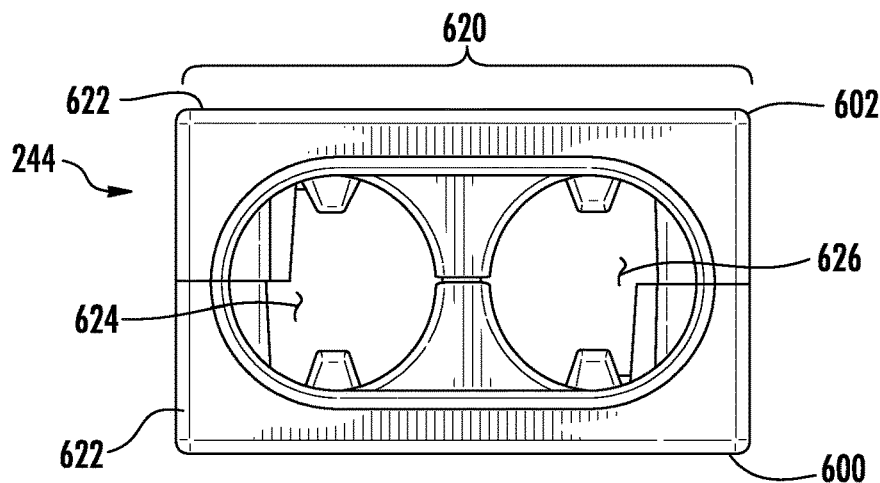
FIGS. 12A-12C are front elevation views of fiber organizers with different interior space configurations.
Figure 12B:
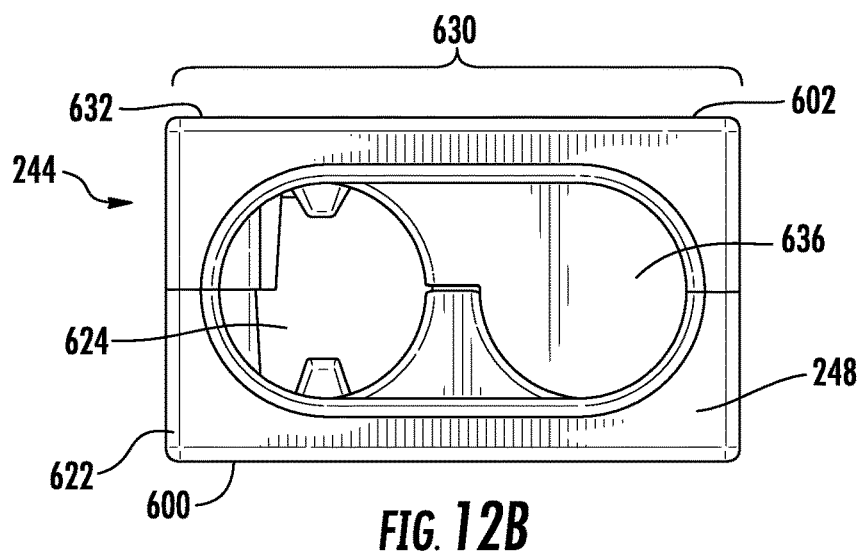
Figure 12C:
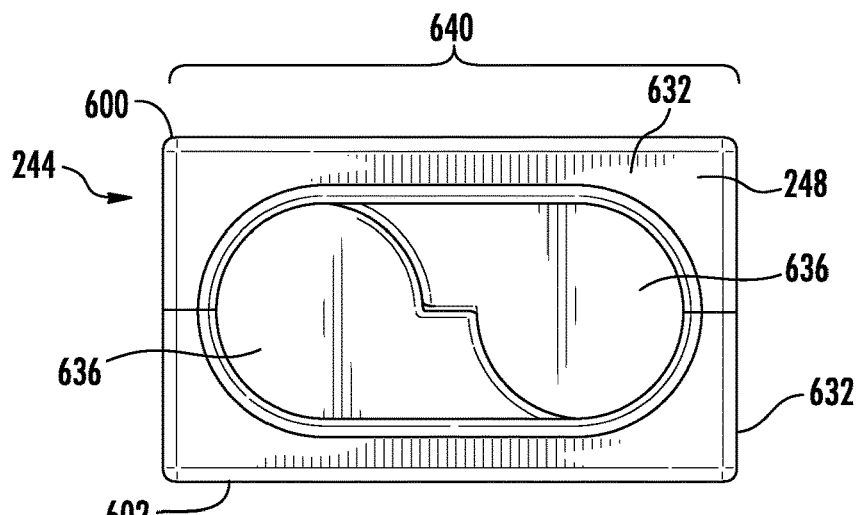

FIGS. 12A-12C depict three views of the second end 248 of the fiber organizer 244 illustrating the first interior space configuration 620, the second interior space configuration 630 and the third interior space configuration 640, respectively. In FIG. 12A, both the first segment 600 and the second segment 602 are the first design types 622 attached together to form the first fiber optic cable seating area 624, the second fiber optic cable seating area 626, the first optical fiber pass-through 267 (not shown in FIG. 12A), and the second optical fiber pass-through 628 (not shown in FIG. 12A). In FIG. 12B, the first segment 600 is the first design type 622, but the second segment 602 is the second design type 632 attached together to form the first fiber optic cable seating area 624, but blocked second fiber optic cable seating area 626; and the first optical fiber pass-through 627 (not shown in FIG. 12B), but blocked second optical fiber pass-through 628 (not shown in FIG. 12B). The cap 636 blocks the second fiber optic cable seating area 626 and the second optical fiber pass-through 628. In FIG. 12C, both the first segment 600 and the second segment 602 are second design type 632 attached together to provide two caps 636 blocking the first fiber optic cable seating area 624, the second fiber optic cable seating area 626, the first optical fiber pass-through 627 and the second optical fiber pass-through 628 (not shown in FIG. 12C). Accordingly, fiber organizer 244 having a third interior space configuration 640 may not receive any fiber optic cables 250 or their optical fibers 218.

Figure 13:
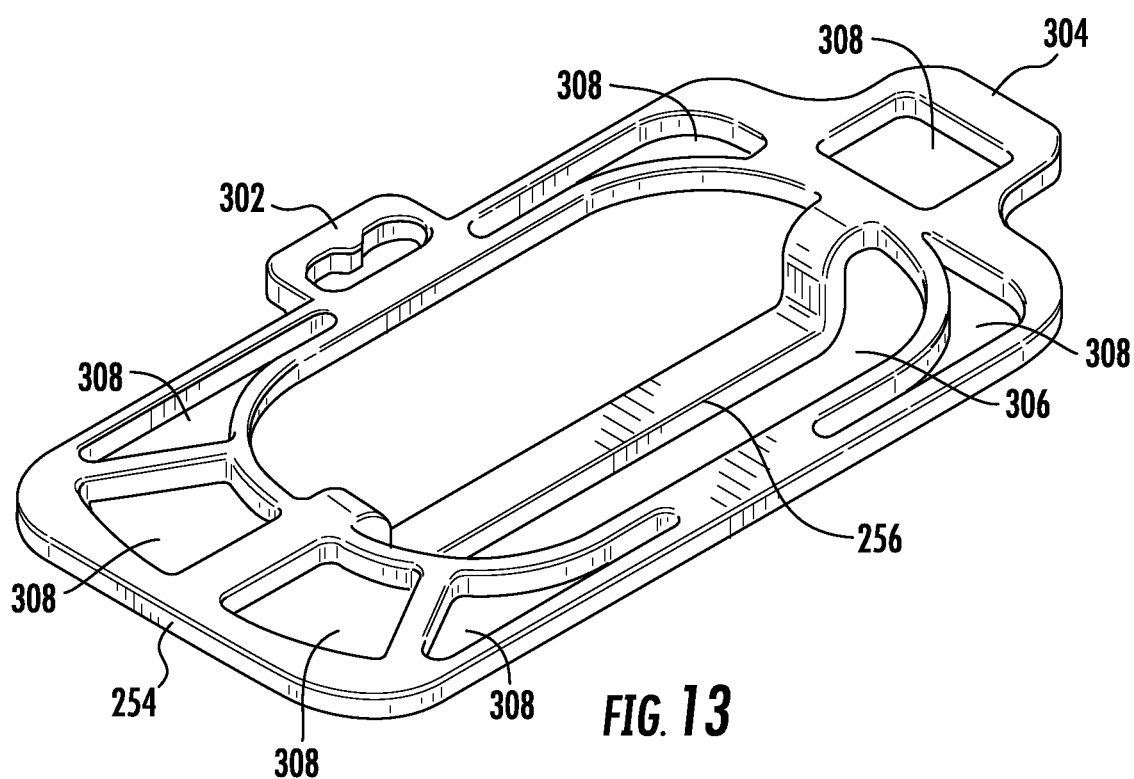
FIG. 13 is a top, perspective view of a fiber retainer shown in FIG. 2.
Figure 16:
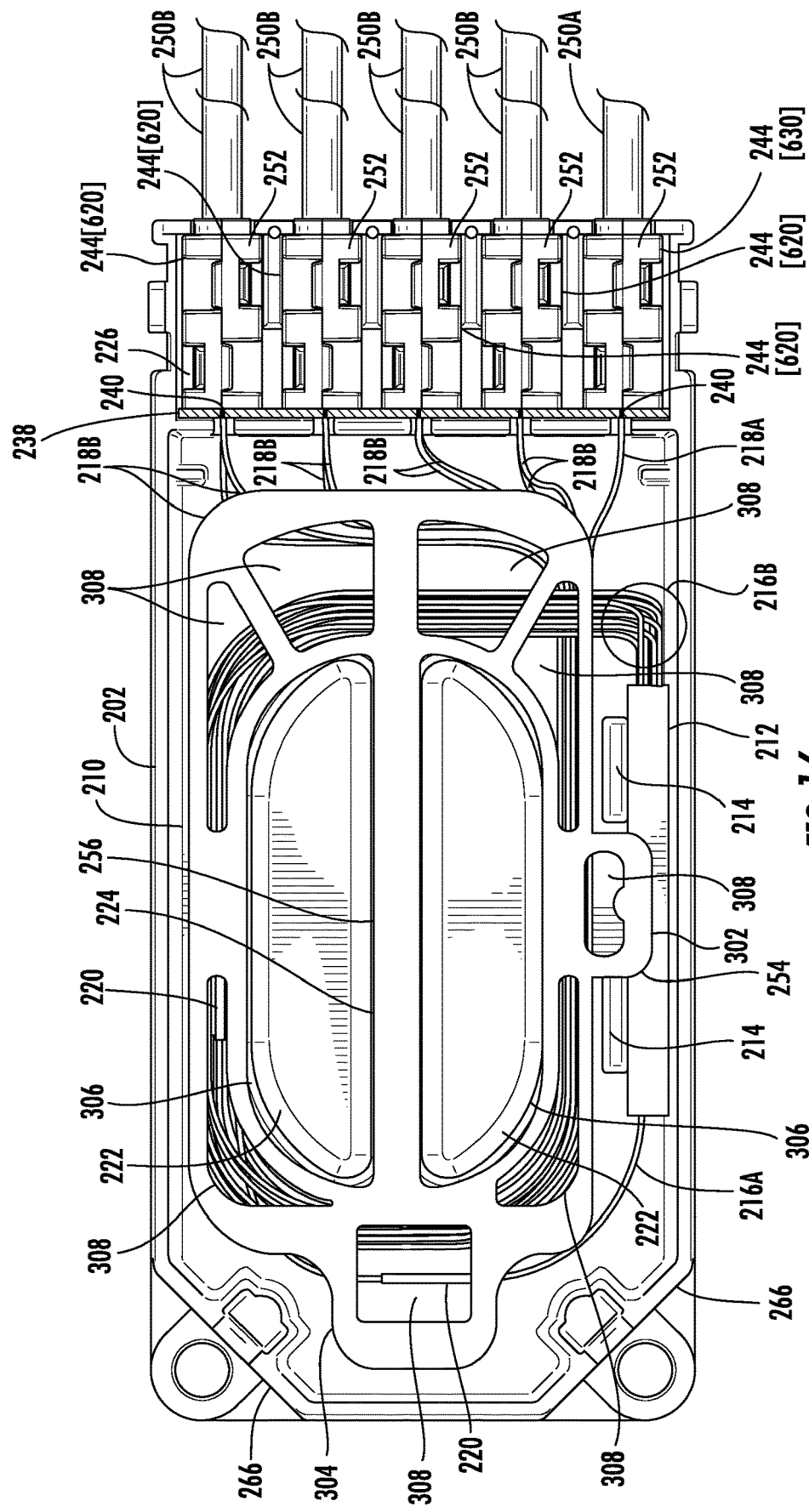
FIG. 16 is a top plan view of the fiber optic multiport of FIG. 15 showing the fiber retainer installed in the first chamber.

Referring now to FIG. 13, and also to FIG. 16, the fiber retainer 254 is shown. The fiber retainer 254 is shaped generally to align with the footprint of the base 204. The mid-span member 256 fits into the center cut 224 of the mandrel 222 with the two portions of the mandrel 222 positioning through the mandrel cut-outs 306 as the fiber retainer 254 descends in the base 204. Side extension 302 may be used to cover the area where the optical splitter 212 is situated, while end extension 304 covers the area between the angled base corners 266 (shown in FIG. 4). Apertures 308 allow the potting material to flow down past the fiber retainer 254 to cover the optical splitter 212, splitter legs 216, optical fiber 218 and splices 220.

Figure 14:
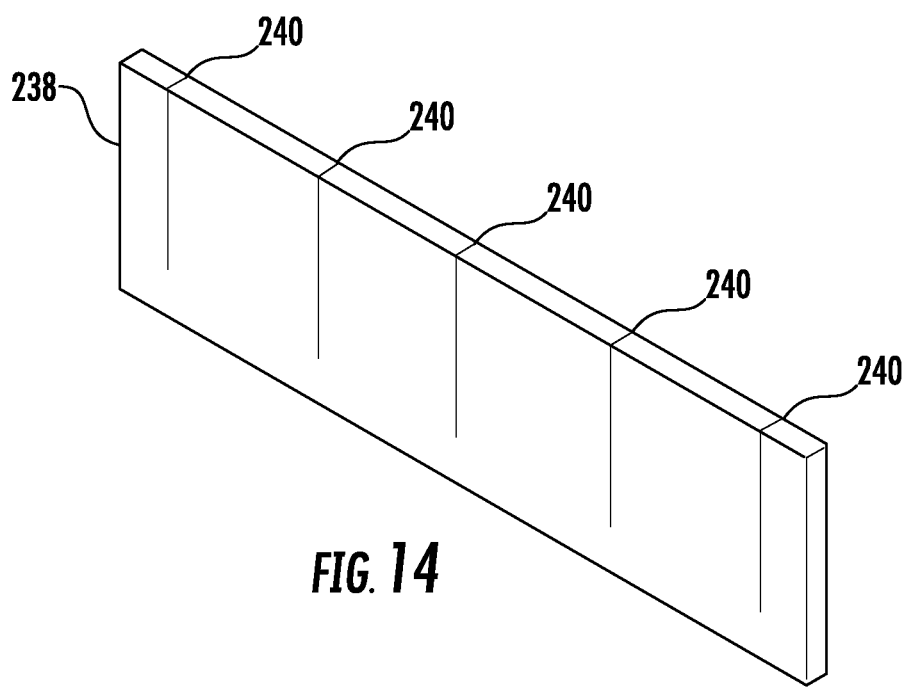
FIG. 14 is a front, perspective view of blocking material in the form of a foam pad with slits cut therethrough shown in FIG. 2.

The foam pad 238 is illustrated in FIG. 14. The foam pad 238 may be constructed from any suitable thermoplastic or thermoset rubber material, although silicone based foam may be preferred. The foam pad 238 may need to withstand temperatures as high as 100° C. The surface of the foam pad 238 may be open cell or closed cell foam sheet. Open cell may be preferred. The surface of the foam pad 238 may be smooth with no openings and no texture. The foam pad 238 may have a thickness of between about 1/16-1/8 inches, with 1/16 inches preferred. The hardness of the foam should be between Shore 00 20 and Shore A 30, with Shore 00 45 preferred. The foam material should not react with the liquid potting compound or cause any cure issue with the compound. The foam pad 238 may be constructed of a microcellular urethane foam material having an adhesive backing, such as, for example, a black Poron® foam. Alternatively to a foam pad 238, a thixotropic gel applied to the wall 228 may be used as the blocking material 236.

Figure 15:
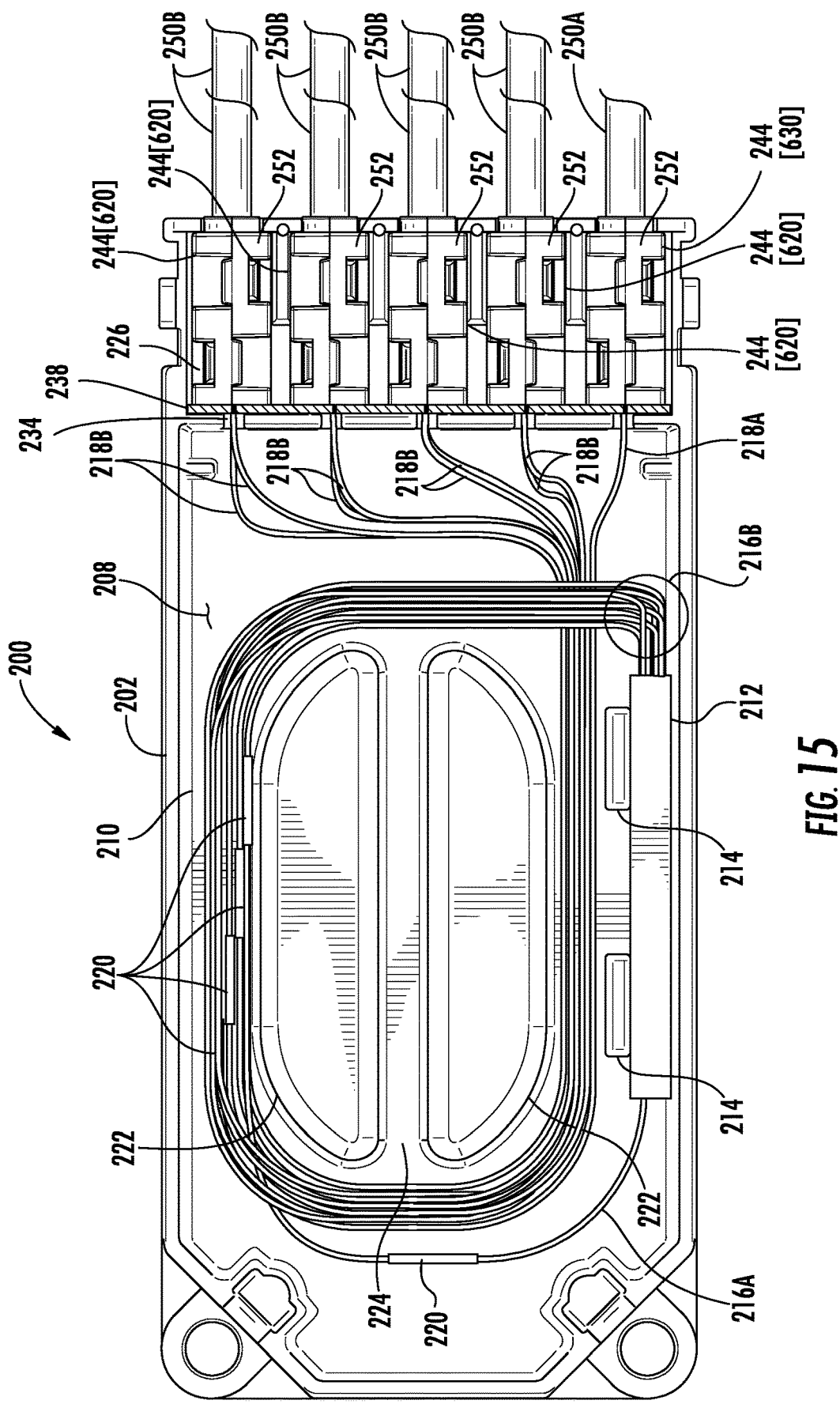
FIG. 15 is a top, plan view of the fiber optic multiport of FIG. 2 showing the optical splitter, splitter legs, optical fibers, fiber organizers and fiber optic cables installed.
Figure 17:
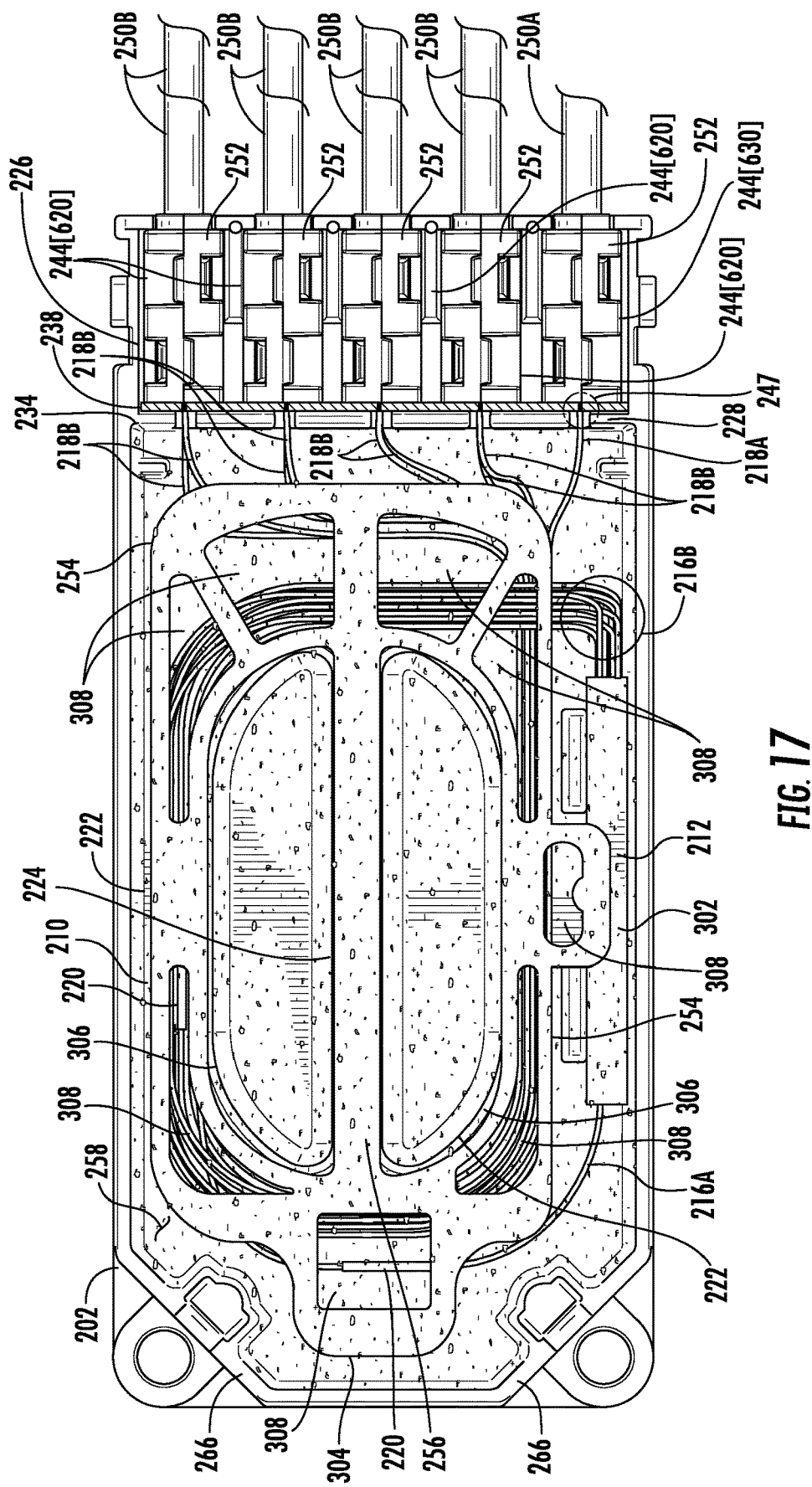
FIG. 17 is a top, plan view of the fiber optic multiport of FIG. 15, showing the potting material disposed in the first chamber.

Referring now to FIGS. 15-17, the fiber optic multiport 200 is shown in three different stages of the first chamber 210 assembly. In FIGS. 15-17, one input fiber optic cable 250A and eight (8) output fiber optic cables 250B are shown being received by five (5) fiber organizers 244 installed in the second chamber 226 in respective placement partitions 252. In FIGS. 15-17, the one input fiber optic cable 250A is received by one (1) fiber organizer 244. Accordingly, and as discussed above with respect to FIGS. 9-11, fiber organizer 244 may have a second seating configuration 630 with a first cable seat 624 and a cap 636. The eight (8) output fiber optic cables 250B are shown being received by four (4) fiber organizers 244 with two (2) output fiber optic cables 250B being received by each fiber organizer 244. Accordingly, and as discussed above with respect to FIGS. 8-10, those four (4) fiber organizers may have a first seating configuration 620 with a first cable seat 624 and a second cable seat 626. Optical fibers 218 in individual buffer tubes 300 extend through the optical fiber passages 242 (see FIG. 2A) formed through the slits 240 in the foam pad 238 and the slots 234 in the wall 228 into the first chamber 210. The optical fiber 218A from the input fiber optic cable 250A extends in one optical fiber passage 242, while two optical fibers 218B from two output fiber optic cables 250B extend through one optical fiber passage 242 (see FIG. 2A). In this regard, four (4) optical fiber passages 242 (see FIG. 2A) each have two optical fibers 218B extending through it to the first chamber 210 from the second chamber 226.

The optical fiber 218A from the input fiber optic cable 250A is spliced to the input splitter leg 216A of the optical splitter 212. The eight optical fibers 218B from the output fiber optic cables 250B each are fusion spliced to one of the output splitter legs 216B. The optical splitter 212 situated in the interior 208 in the retainer clips 214 may be a 1:8 optical splitter. The optical fibers 218A, 218B, input splitter leg 216A and output splitter legs 216B route in the first chamber 210 around the mandrel 222, but not through the center cut 224.

With reference now to FIGS. 16 and 17, the fiber retainer 254 is positioned in the first chamber 210 with the mid-span member 256 friction fit into the center cut 224. The side extension 302 of the fiber retainer 254 locates over the optical splitter 212, while the end extension 304 locates over the optical fibers 218A, 218B and splitter legs 216A, 216B that are routed between the angled base corners 266. The two portions of the mandrel 222 are positioned through the mandrel cut-outs 306. Apertures 308 provide access to the optical fibers 218A, 218B and splitter legs 216A, 216B.

Referring now only to FIG. 17, the potting material 258 is shown disposed in the first chamber 210, encasing the fiber retainer 254, optical splitter 212, optical fibers 218A, 218B, input splitter leg 216A and output splitter legs 216B, through apertures 308. There is no ingress of potting material 258 into the second chamber 226. The fiber organizers 244 applied pressure to the foam pad 238, compressing the foam pad 238 and sealing any gaps in the wall 228 and the optical fiber passages 242 through which the optical fibers 218A, 218B were routed to the first chamber 210 from the second chamber 226.

Figure 18:
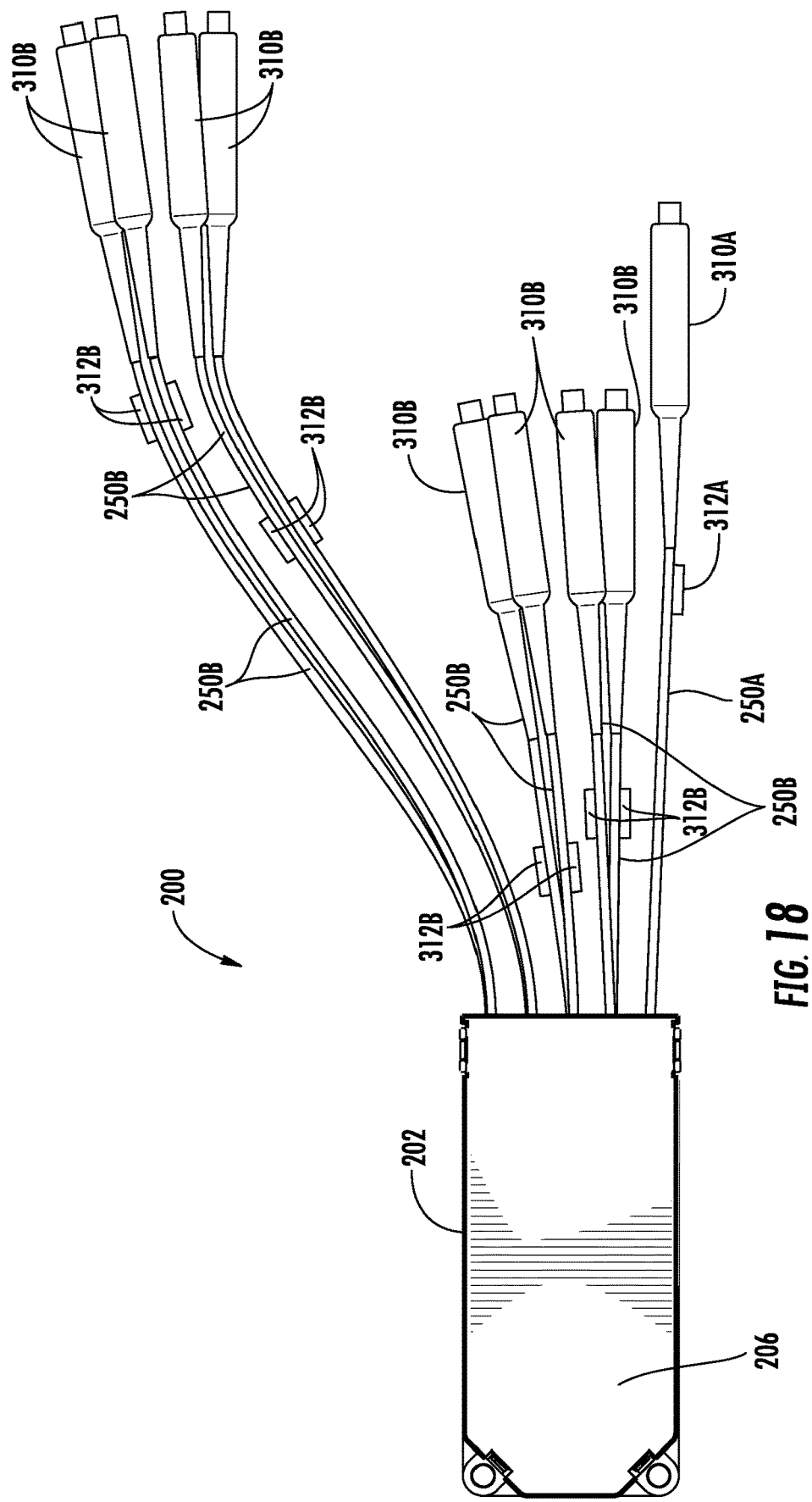
FIG. 18 is a top, plan view of a fiber optic multiport shown with one input fiber optic pigtail and eight output fiber optic pigtails.

FIG. 18 illustrates the exemplary fiber optic multiport 200 in a complete assembled state, with the cover 206 attached and with one input fiber optic cable 250A in the form of an input fiber optic pigtail terminated with a hardened fiber optic connector 310A, and eight (8) output fiber optic cables 205B each in the form of an output fiber optic pigtail, and each terminated with a hardened fiber optic connector 310B. The hardened fiber optic connectors 310A, 310B may be OptiTap® connectors as supplied by Corning Optical Communications, LLC of Hickory, N.C. Additionally, the input fiber optic cable 250A and the output fiber optic cables 250B may each have port connection indicia 312A, 312B, respectively, which is indicative of a port connection type to which the input fiber optic cable 250A and the output fiber optic cables 250B may be attached, such as for example, an input port and an output port. As another example, the multiports disclosed herein may use the concepts disclosed in U.S. Provisional Patent Application No. 62/199,545 filed Jul. 31, 2015 and titled "Fiber Optic Multiport Having Different Types of Ports for Multi-Use", the content of which is incorporated herein by reference in its entirety.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic multiport, comprising:
   an enclosure defining an interior;
   a first chamber defined by the interior, wherein the first chamber comprises a plurality of optical fibers located therein, and wherein a potting material is disposed in the first chamber to physically secure the plurality of optical fibers in the first chamber;
   a second chamber defined by the interior adjacent the first chamber;
   a wall separating the first chamber from the second chamber, wherein the wall has a first face and a second face, and wherein the wall has a plurality of slots extended therethrough from the first face to the second face, and wherein the plurality of optical fibers route through the plurality of slots between the first chamber and the second chamber;
   a blocking material pressed against the wall to retain the potting material in the first chamber, wherein the blocking material is a foam pad or a thixotropic gel; and
   a plurality of fiber organizers positioned in the second chamber, and wherein each of the plurality of fiber organizers comprises a first end and a second end, and wherein the plurality of fiber organizers press against the blocking material, wherein at least one of the plurality of fiber organizers comprises a first segment attached to a second segment using complementary attachment structures and define an interior space configuration, and the complementary attachment structures comprise a side tab and a side latch.

2. The fiber optic multiport of claim 1, wherein at least one of the plurality of fiber organizers receives at the first end at least one of the plurality of optical fibers extended between the first chamber and the second chamber, and receives at the second end a fiber optic cable protecting the at least one of the plurality of optical fibers.

3. The fiber optic multiport of claim 1, wherein the interior space configuration comprises a fiber optic cable seating area and an optical fiber pass-through.

4. The fiber optic multiport of claim 3, wherein the fiber optic cable seating area comprises a first fiber optic cable seating area, and wherein the optical fiber pass-through comprises a first optical fiber pass-through.

5. The fiber optic multiport of claim 3, wherein:
   the fiber optic cable seating area comprises a first fiber optic cable seating area for seating a first fiber optic cable and a second fiber optic cable seating area for seating a second fiber optic cable, and wherein the optical fiber pass-through comprises a first optical fiber pass-through for receiving an optical fiber of the first fiber optic cable and a second optical fiber pass-through for receiving an optical fiber of the second fiber optic cable; and
   the first optical fiber and the second optical fiber are individual ones of the plurality of optical fibers.

6. The fiber optic multiport of claim 5, wherein the second chamber comprises a plurality of placement partitions, and wherein each of the plurality of fiber organizers is installed in one of the plurality of placement partitions.

7. The fiber optic multiport of claim 3, wherein the fiber optic cable seats in the fiber optic cable seating area, and wherein a jacket of the fiber optic cable is terminated, and wherein strength members are exposed in the at least one of the plurality of fiber organizers.

8. The fiber optic multiport of claim 7, wherein the potting material disposed in the at least one of the plurality of fiber organizers secures the jacket and the strength members, and wherein the fiber optic cable is restrained and the at least one of the plurality of optical fibers is prevented from pistoning into and out of the jacket.

9. The fiber optic multiport of claim 1, wherein the interior space configuration comprises a blocked fiber optic seating area and a blocked optical fiber pass-through, and the blocked fiber optic seating area and the blocked optical fiber pass-through do not receive an optical fiber.

10. The fiber optic multiport of claim 1, wherein the second chamber comprises a plurality of placement partitions, and wherein each of the plurality of fiber organizers is installed in one of the plurality of placement partitions.

11. The fiber optic multiport of claim 1, wherein the blocking material comprises a foam pad comprising a compressible material, and wherein the plurality of optical fibers are routed through the foam pad between the first chamber and the second chamber.

12. The fiber optic multiport of claim 11, wherein the foam pad comprises a plurality of slits with at least one slit of the plurality of slits aligned with at least one slot of the plurality of slots of the wall, and wherein an optical fiber passage between the first chamber and the second chamber is formed thereby and wherein one of the plurality of optical fibers routes between the first chamber and the second chamber through the optical fiber passage.

13. The fiber optic multiport of claim 11, wherein the foam pad is constructed of thermoplastic or thermoset rubber material.

14. The fiber optic multiport of claim 11, wherein the foam pad comprises a silicone-based foam.

15. The fiber optic multiport of claim 11, wherein the foam pad has a hardness range of about Shore 00 20 to Shore A 30, with a preferred hardness of about Shore 00 45, and be one of closed cell and open cell structure, and be able to withstand temperatures of at least 100° C.

16. The fiber optic multiport of claim 11, wherein the foam pad is secured to one of the first face and the second face of the wall.

17. The fiber optic multiport of claim 11, wherein the foam pad is constructed of a microcellular urethane foam with an adhesive backing.

18. The fiber optic multiport of claim 1, further comprising an optical splitter disposed within the first chamber.

19. The fiber optic multiport of claim 1, wherein each of the first segment and the second segment comprises a complementary attachment structure that attaches the first segment to the second segment.

20. The fiber optical multiport of claim 1, wherein the blocking material is attached to the second face of the wall by an adhesive.

21. A fiber optic multiport, comprising:
an enclosure defining an interior;
a first chamber positioned in the interior, wherein the first chamber has an optical splitter with a plurality of splitter legs extended therefrom and connected to a plurality of optical fibers located therein, and wherein potting material is disposed in the first chamber to physically secure the optical splitter, the plurality of splitter legs and the plurality of optical fibers in the first chamber;
a second chamber positioned in the interior adjacent the first chamber;
a wall separating the first chamber from the second chamber, wherein the wall has a first face and a second face, and wherein the wall has a plurality of slots extended therethrough from the first face to the second face, and wherein the plurality of optical fibers route through the plurality of slots between the first chamber and the second chamber;
a fiber organizer having a first end and a second end, wherein the fiber organizer is installed in the second chamber and receives at the first end at least one of the plurality of optical fibers extended between the first chamber and the second chamber, wherein at least one of the plurality of fiber organizers comprises a first segment attached to a second segment using complementary attachment structures and define an interior space configuration, and the complementary attachment structures comprise a side tab and a side latch; and
a blocking material attached to the second face of the wall such that the fiber organizer presses against the blocking material, wherein the blocking material is a foam pad or a thixotropic gel.

22. The fiber optic multiport of claim 21, wherein the fiber organizer receives at the second end a fiber optic cable protecting the at least one of the plurality of optical fibers at the second end.

23. The fiber optic multiport of claim 22, wherein a jacket of the fiber optic cable ends and strength members of the fiber optic cable are exposed in the fiber organizer, and wherein the potting material disposed in the fiber organizer secures the jacket and the strength members, and wherein the fiber optic cable is restrained and the at least one of the plurality of optical fibers is prevented from pistoning into and out of the jacket.

24. The fiber optic multiport of claim 22, wherein the fiber optic cable comprises a port connection indicia.

25. The fiber optic multiport of claim 21, wherein the interior space configuration comprises a fiber optic cable seating area and an optical fiber pass-through.

26. The fiber optic multiport of claim 25, wherein the fiber optic cable seating area comprises a first fiber optic cable seating area, and wherein the optical fiber pass-through comprises a first optical fiber pass-through.

27. The fiber optic multiport of claim 26, wherein:
the fiber optic cable seating area comprises a first fiber optic cable seating area for seating a first fiber optic cable and a second fiber optic cable seating area for seating a second fiber optic cable, and wherein the optical fiber pass-through comprises a first optical fiber pass-through for receiving an optical fiber of the first fiber optic cable and a second optical fiber pass-through for receiving an optical fiber of the second fiber optic cable; and
the first optical fiber and the second optical fiber are individual ones of the plurality of optical fibers.

* * * * *